(No Model.)

W. N. LAUGHLIN.
STOVE PIPE JOINT.

No. 319,102. Patented June 2, 1885.

Witnesses,
Robert Everett
Ewell Asick

Inventor,
William N. Laughlin.
By C. N. Watson & Co
Attys.

UNITED STATES PATENT OFFICE.

WILLIAM N. LAUGHLIN, OF MIDLOTHIAN, TEXAS.

STOVE-PIPE JOINT.

SPECIFICATION forming part of Letters Patent No. 319,102, dated June 2, 1885.

Application filed June 25, 1884. (No model.)

*To all whom it may concern:*

Be it known that I, WILLIAM N. LAUGHLIN, of Midlothian, Texas, have invented certain new and useful Improvements in Stove-Pipe Joints, of which the following is a specification.

My invention relates to an improvement in stove-pipe joints; and the object of the invention is to secure a firm and safe connection between the sections of pipe, and at the same time to protect the joint so that the pipe is not liable to crack or split at that point.

My invention consists in combining with the threaded sections of a stove-pipe a cap or band secured to one of the sections and overlapping the other, so as to inclose and protect the joint.

It consists, further, in forming on one of the threaded sections a stop, against which the end of the other section bears, and which prevents the sections from telescoping in case the threads should wear or become flattened after long-continued use.

Figure 1:
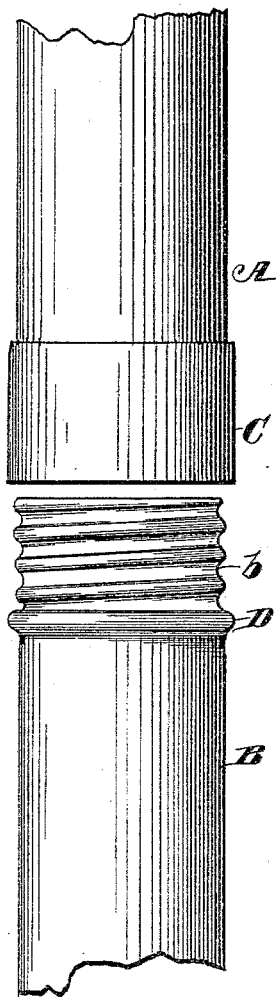
Figure 2:
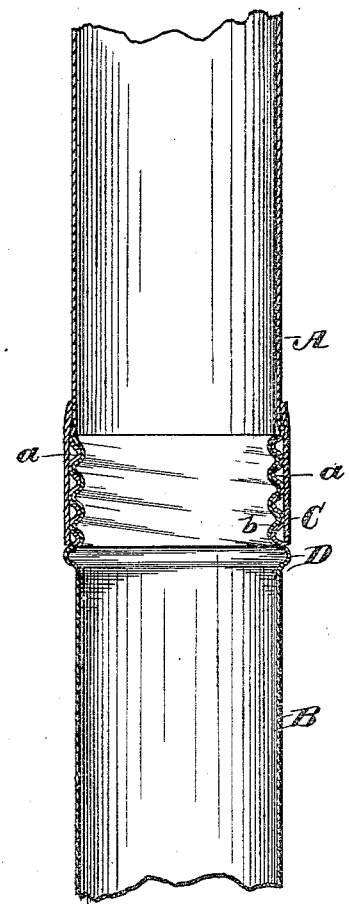

The invention is illustrated in the accompanying drawings, in which Figure 1 is a side elevation of two sections of pipe, and Fig. 2 a central vertical section of the same.

A represents a section of ordinary sheet-iron stove-pipe on which are pressed or struck up the corrugations $a\ a$, forming the interior or female thread. B represents the adjacent section, on the exterior surface of which is formed the corresponding male thread, $b$. To the part A is secured, by soldering or otherwise, a sheet-metal ring or band, C, which, when the parts are screwed together, overlaps the joint and conceals the threads. This ring, besides forming a smooth finish for the pipe, also protects both parts or sections from splitting or cracking longitudinally at the joint. Upon the outside of the male section, at the base of the thread, is formed a ridge, D, against which the end of the female section A bears when the parts are screwed together. This ridge, therefore, forms a stop, which will prevent any further telescoping of the sections, should the threads have become flattened sufficiently to permit any independent sliding motion.

By constructing my stove-pipe in the manner described I obviate the objections to the use of threaded sheet-metal tubes hitherto used for this purpose—viz., the liability of such tubes to split and the longitudinal slide of the sections after the threads have become worn.

Having described my invention, I claim—

1. The combination, with the screw-threaded pipe-sections A B, of the inclosing ring or band C, substantially as described.

2. The combination of the threaded pipe-sections A B, the ring or band C, and the stop D, substantially as described.

In testimony whereof I have hereunto set my hand this 7th day of June, 1884.

WILLIAM N. LAUGHLIN.

Witnesses:
L. H. HUGHES,
W. W. BROWDER.